United States Patent [19]

Hardt

[11] Patent Number: 5,653,518
[45] Date of Patent: Aug. 5, 1997

[54] QUICK RELEASE DRIVE UNIT RAIL MEMBERS

[75] Inventor: Thomas T. Hardt, Missouri City, Tex.

[73] Assignee: Compaq Computer Corporation, Houston, Tex.

[21] Appl. No.: 503,031

[22] Filed: Jul. 17, 1995

Related U.S. Application Data

[63] Continuation of Ser. No. 119,991, Sep. 10, 1993, abandoned

[51] Int. Cl.$^6$ ..................................................... A47B 88/00
[52] U.S. Cl. ........................... 312/334.4; 312/334.46; 361/726; 361/727
[58] Field of Search ...................... 312/334.7, 257.1, 312/350, 351, 334.4, 334.44, 334.46; 361/685, 726, 727, 731, 732

[56] References Cited

U.S. PATENT DOCUMENTS

| D. 313,015 | 12/1990 | Ryan et al. ........................... D14/100 |
| 1,352,924 | 9/1920 | Stretch ................................ 312/334.22 |
| 2,277,702 | 3/1942 | Kennedy ............................. 312/334.46 |
| 3,899,721 | 8/1975 | Borchard et al. ..................... 317/101 |
| 4,065,200 | 12/1977 | D'Angelo ............................... 339/65 |
| 4,232,356 | 11/1980 | Saunders et al. ....................... 361/415 |
| 4,304,966 | 12/1981 | Beirn et al. ........................... 179/1 MN |
| 4,349,237 | 9/1982 | Cobaugh et al. ........................ 339/65 |
| 4,479,263 | 10/1984 | Rosenfeldt et al. ..................... 455/602 |
| 4,517,512 | 5/1985 | Petrich et al. ......................... 324/73 R |
| 4,532,576 | 7/1985 | Reimer ................................. 361/415 |
| 4,688,131 | 8/1987 | Nodd et al. ........................... 361/685 |
| 4,742,478 | 5/1988 | Nigro, Jr. et al. ..................... 364/708 |
| 4,748,540 | 5/1988 | Henneberg et al. .................... 361/424 |

(List continued on next page.)

FOREIGN PATENT DOCUMENTS

| 0176907A | 4/1986 | European Pat. Off. ............... 361/394 |
| 1366567 | 6/1964 | France ................................ 361/415 |
| 1-194397A | 8/1989 | Japan ................................. 361/415 |
| 659165A | 12/1986 | Switzerland ......................... 361/415 |
| 1140-276-A | 2/1985 | U.S.S.R. .............................. 361/415 |
| 87/05776 | 9/1987 | WIPO ................................. 361/415 |

OTHER PUBLICATIONS 3 photographs of bottom of IBM PS/2 Model 80 unit (cited in U.S. Pat. No. 5,020,768 listed above) (2 pgs. total).
AST Computers Advertisement in PC Week, Feb. 19, 1990, pp. 67–70 (cited in U.S. Pat. No. 5,020,768 listed above).
ALTEC Technology Corp. Advertisement in INFOWORLD, Feb. 5, 1990, pp. 87–88 (cited in U.S. Pat. No. 5,020,768 listed above).
Sys Technology, Inc. Advertisement in PC Week, Feb. 12, 1990, pp. 99–100 (cited in U.S. Pat. No. 5,020,768 listed above).
IBM Tech. Discl. Bulletin, vol. 29, No. 9, Feb. 1987, pp. 4117–4118, "Bridge Assembly for Mounting Electromagnetic Devices" (no author).
IBM Tech. Discl. Bulletin, vol. 28, No. 12, May 1986, pp. 5519–5521, "Spring–Loaded File Rails" (no author).
IBM Tech. Discl. Bulletin, vol. 30, No. 1, Jun. 1987, pp. 392–393, "Direct–Access Storage Device Commodity–Stacking Plates" (no author).
IBM Tech. Discl. Bulletin, vol. 28, No. 6, Nov. 1985, pp. 2514–2515 "Universal, Low–Cost Hard–File Mounting Assembly" (no author).
Advertisements in PC Week, Feb. 19, 1990 (2 pages).
5 photographs of quick release guide rail disclosed on p. 2, line 19 to p. 3, line 9 of the application.
Prior art L-shaped guide rail disclosed on p. 2, lines 6–17 of the application.

*Primary Examiner*—Peter M. Cuomo
*Assistant Examiner*—Gerald A. Anderson
*Attorney, Agent, or Firm*—Pravel, Hewitt, Kimball & Krieger

[57] ABSTRACT

Quick release rail members for a computer drive unit with an arm including a detent movable relative to a D-shaped slot provided in the frame of a computer unit. Using one hand, both rail members can be disengaged for easy removal of the drive unit from the frame.

18 Claims, 3 Drawing Sheets

U.S. PATENT DOCUMENTS

| | | | |
|---|---|---|---|
| 4,920,453 | 4/1990 | Onose et al. | 361/392 |
| 5,020,768 | 6/1991 | Hardt et al. | 248/678 |
| 5,021,616 | 6/1991 | Hardt | 200/43.16 |
| 5,208,722 | 5/1993 | Ryan et al. | 360/99.01 |
| 5,236,259 | 8/1993 | Ryan et al. | 312/244 |
| 5,262,923 | 11/1993 | Batta et al. | 312/334.7 |
| 5,277,615 | 1/1994 | Hastings et al. | 361/685 |
| 5,397,176 | 3/1995 | Allen et al. | |
| 5,446,619 | 8/1995 | Madsen et al. | 361/695 |
| 5,491,611 | 2/1996 | Stewart et al. | |

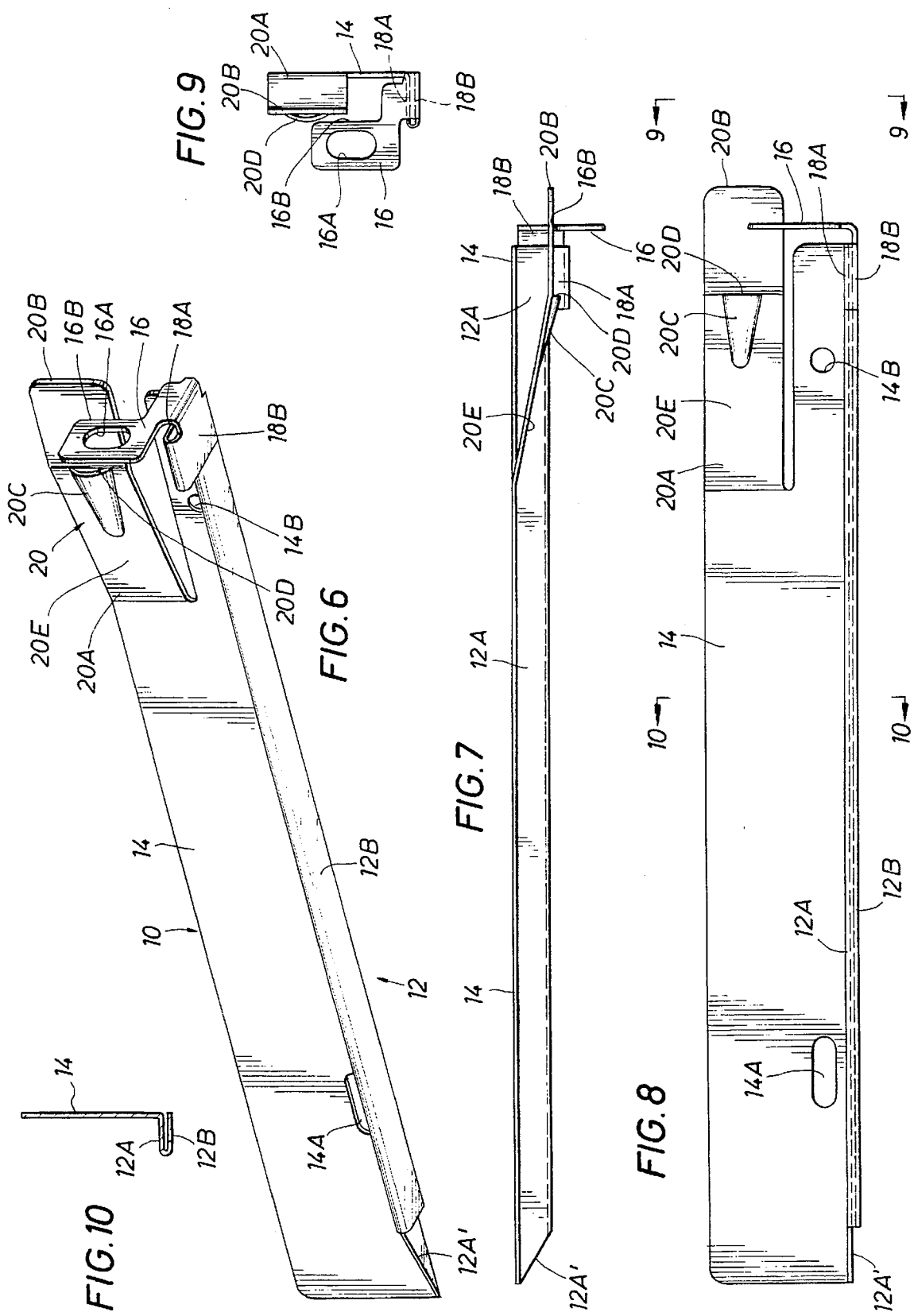

QUICK RELEASE DRIVE UNIT RAIL MEMBERS

This is a continuation of application Ser. No. 08/119,991 filed on Sep. 10, 1993, now abandoned.

FIELD OF THE INVENTION

This invention relates to computer systems and more particularly to quick release drive unit rail members for a computer system.

BACKGROUND OF THE INVENTION

Personal computers are generally comprised of three physical components. First, there is the main computer system unit which holds most of the computer operation internals, such as power supply, circuit boards and drive units. A keyboard is used for data entry and a display screen or monitor is provided for the display of data. This arrangement is, of course, well known.

In an effort to minimize the desk surface area required for a personal computer, the system units have been placed on the floor next to desks or tables. In that configuration, the system units are generally rectangular boxes and are designed to stand with the longest axis in the vertical direction on the floor. These systems are called "tower units".

Guide rails are presently being used for removably positioning drive units in both the typical desk top computer unit and the tower unit. These drive units include disk drives, hard drives, tape drives and other conventional drive units.

A prior art L-shaped guide rail comprises a vertical member and a horizontal member. The guide rail horizontal members slide on support members extending inwardly in the frame of the computer unit. Abutment members having a hole therein are provided on one end of the guide rails. The abutment member extends outwardly from the guide rail a sufficient distance to engage the front of the frame. The abutment member holes were aligned with bores in the frame to receive screws to hold the drive unit in the frame. The screws are threaded in the frame by use of a conventional screw driver.

A known quick release guide rail includes an elongated plastic member having holes for attachment of the rail to a drive unit. One end of the plastic elongated member includes a generally U-shaped resilient portion. The plastic elongated member is received into a metal channel that is in turn attached to the computer unit frame. Each leg of the U-shaped member has an outwardly facing protuberance. Each protuberance is received into slots in the metal channel. When the two legs of the U-shaped member were pressed together the protuberances clear their respective slots to allow the attached drive unit to slide along the channel for removal from the computer unit. This guide rail therefore includes two components and generally requires two hands to remove the drive unit with the pulling force on the plastic U-member since one hand is used to press the U-shaped member legs together.

It would be desirable to reduce manufacturing costs by using the existing frame with additional D-shaped slots and a one-piece rail member for positively maintaining a drive unit with the frame that could be quickly released.

SUMMARY OF THE INVENTION

A pair of spaced apart support members are provided on opposed sides of a computer system unit frame. The support members include a track member in the front of the frame and a channel member spaced rearwardly from the track member to limit upward movement of a drive unit when attached to the rail members of the present invention.

Advantageously each rail member is provided with an arm having a detent moveable relative to a slot provided in the frame. Each arm moves between an outwardly extended position to maintain the drive unit in the frame and an inwardly disengaged position for easily removing the drive unit from the frame.

These features of the invention are not necessarily the only features that will be disclosed in the specification. Additionally, the features of the invention have been described herein in a summary fashion. It is not the intent to disclose all of the features nor the true scope of the invention within this Summary of the Invention. The specification will describe the details of this invention for the understanding of those skilled in the art and the claims will describe the actual scope of the invention.

BRIEF DESCRIPTION OF THE DRAWINGS

The objects, advantages and features of the invention will become more apparent by reference to the drawings which are appended hereto wherein like numerals indicate like parts and wherein an illustrated embodiment of the invention is shown, of which:

FIG. 6 is an enlarged perspective view of one of the rail members of the present invention;

FIG. 7 is a plan view of the rail member of the present invention shown in FIG. 6;

FIG. 8 is a side elevational view of the rail member of the present invention shown in FIG. 6;

FIG. 9 is a section view taken along line 9—9 of FIG. 8; and

FIG. 10 is a section view taken along line 10—10 of FIG. 8.

DETAILED DESCRIPTION OF PREFERRED EMBODIMENT

Figure 1:
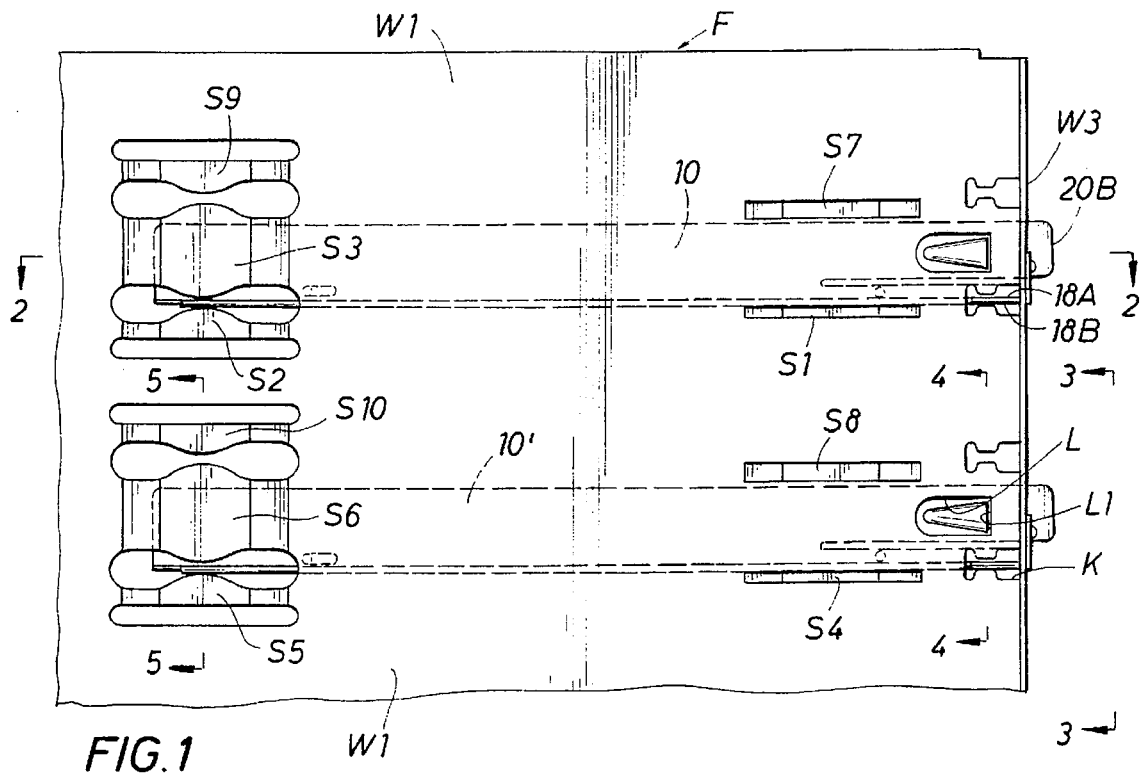
FIG. 1 an elevational partial view of the frame or chassis of a computer unit with rail members of the present invention.

Referring to the drawings, the letter F generally designates a frame for a computer unit used for this invention. The computer unit frame shown is for a tower unit having a generally rectangular box configuration. Such a tower unit is described in a patent application filed on even date and entitled "ALIGNED QUICK RELEASE COVER FOR COMPUTER SYSTEM", U.S. Pat. No. 5,491,611, which is incorporated herein for all purposes and assigned to the assignee of the present invention.

The tower unit could include an upwardly angled disk drive unit bay which cooperates with the tower unit chassis or frame to mount one or more disk drive units at an upwardly facing angle so the user may have a better view and better access to the drive units for the insertion or removal of floppy disks. Though not shown, it is contemplated that the support members, such as $S_1$, $S_2$ and $S_3$ of the frame F could be stamped in the frame for an upwardly angled floppy disk drive. The internal components of the tower unit and upwardly angled disk drive bay is the subject of U.S. Pat. No. 5,208,722 which is incorporated herein by reference for all purposes and assigned to the assignee of the present invention. The upwardly angled bay could include a switch cover assembly which will not be described in detail herein but is the subject of U.S. Pat. No. 5,021,616, which is incorporated herein by reference for all purposes and assigned to the assignee of the present invention. One design for the tower unit could be as disclosed in U.S. Pat. No. Des. 313,015 which is also incorporated herein by reference for all purpose and assigned to the assignee of the present invention.

Figure 3:
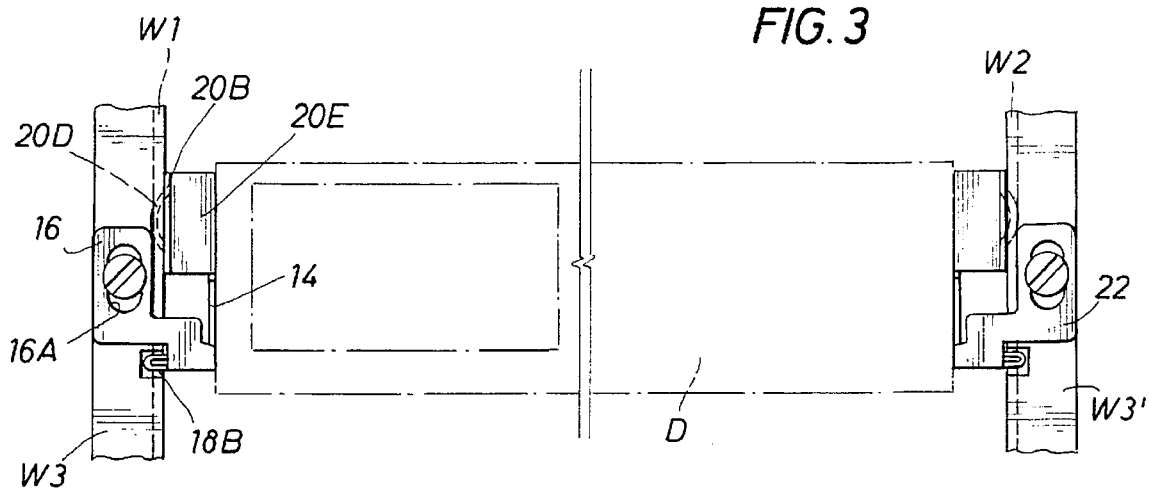
FIG. 3 is an enlarged broken section view taken along line 3—3 of FIG. 1.

The rectangular box-like chassis or frame F includes a first side $W_1$, a second side $W_2$, and a front walls $W_3$ and $W'_3$, as best shown in FIGS. 1 and 3. The preferred frame F uses an 18 gauge steel that has been electro-galvanized with zinc and sealed with clear chromate.

Figure 2:
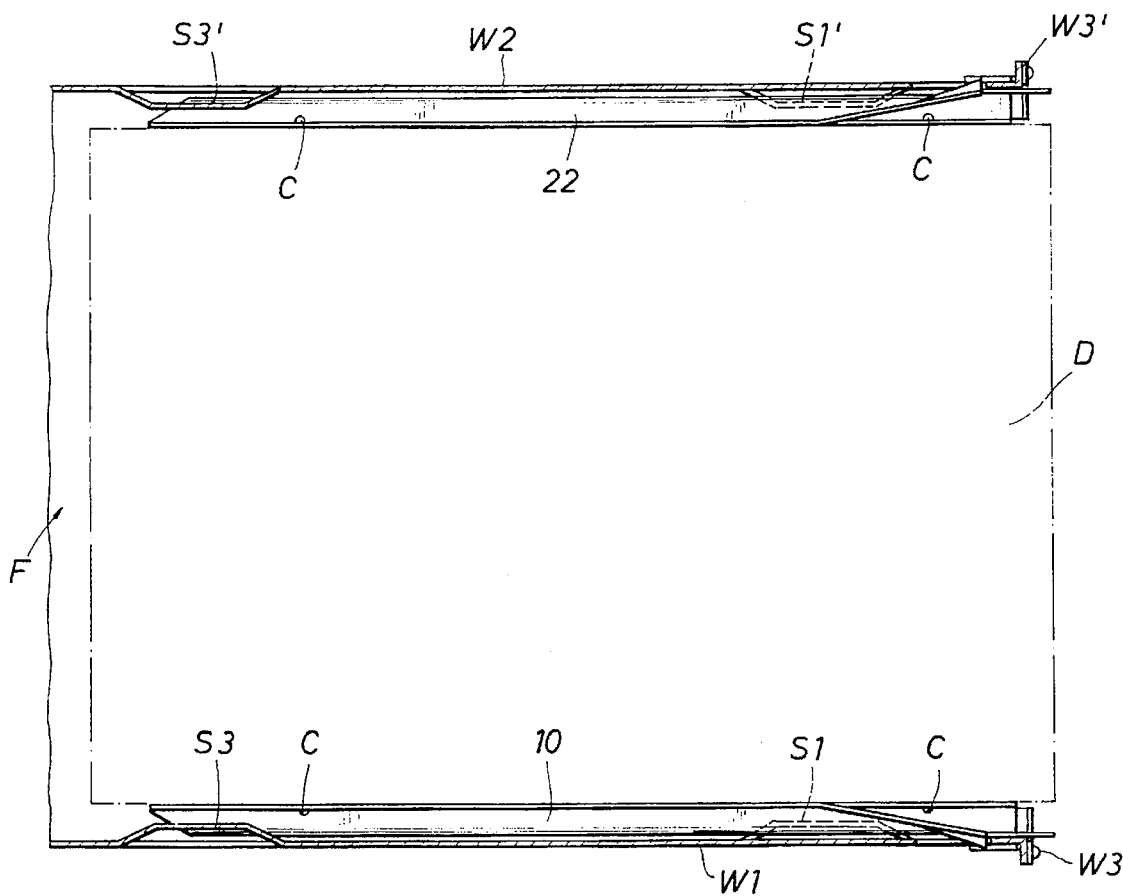
FIG. 2 is a section view taken along line 2—2 of FIG. 1 with the drive unit shown in phantom view.

Returning now to FIG. 1, the side $W_1$ of frame F is illustrated with four bays for positioning drive units therein. The side $W_1$ of the upper bay includes support members comprising a track member $S_7$ near the front of the frame F and, rearwardly from track member $S_7$, a channel member comprising member $S_3$ and $S_9$. Members $S_7$, $S_3$ and $S_9$ are stamped inwardly into the frame, such as shown in FIG. 2. A rail member 10, shown in the next bay, is disposed on track member $S_1$ and a channel member comprised of members $S_2$ and $S_3$. The next lower bay includes track member $S_8$ and a channel member comprising members $S_6$ and $S_{10}$. The lowest bay includes a rail member 10' disposed on track member $S_4$ and a channel member comprising members $S_5$ and $S_6$. Rail member 10' is identical to the rail member 10, as shown in FIGS. 6–10. The support members on the side $W_2$ preferably are the mirror image of the support members on side $W_1$.

Turning now to FIGS. 6–10, one of the two rail members will be discussed in detail. Each rail member is preferably stamped from one piece of 015 stainless steel. The generally L-shaped rail member includes a horizontal member 12 that is comprised of an upper portion 12A and lower portion 12B, as best shown in FIG. 10. The lower portion 12B slides across the support members as will be discussed below. A generally rectangular-shaped vertical member 14 extends approximately the length of the upper portion 12A of the horizontal member 12. The vertical member 14 includes an elongated opening 14A and a circular opening 14B to receive conventional screws for attachment of the rail members to a drive unit D. The front end of the rail member 10 includes an abutment member 16 having a hole 16A therein. The abutment member 16 is attached to a tab member comprising an upper portion 18A and a lower portion 18B, as best shown in FIGS. 6, 8 and 9. The tab member is sized to be received into a slit K, such as shown in FIG. 1, to prevent upward movement of the rail member 10 relative to the frame F. The tab member extends from the upper portion 12A of the horizontal member 12. The rear end of the upper portion 12A of the horizontal member 12 is tapered at 12A' to help guide the rail member through the channel members referenced above and to be discussed below. An arm, generally designated 20, extending from the horizontal member 14 includes a first end 20A and a second end 20B projecting beyond the abutment member 16 and the drive unit D, as best shown in FIGS. 2 and 6–8. Intermediate the first end 20A and the second end 20B is a detent 20C that is used in combination with the D-shaped slot L in the frame F, as best shown in FIG. 1, to positively maintain the rail member and its attached drive unit D within the frame F. The arm 20, as best shown in FIG. 7, is angled outwardly from the vertical member 14 to the detent 20C. The arm 20 then runs parallel with the vertical member 14 to the second end 20B so the second end of the arm 20 does not interfere with the detent's front edge 20D engagement of side $L_1$ of the D-shaped slot L. The second end 20B of the detent is prevented from outward movement when partially removed from the frame F by a stop shoulder 16B on the abutment member 16, as best shown in FIGS. 7 and 9.

The rail member 22 for attachment to the other side of the drive unit D, as best shown in FIGS. 2–5, is a mirror image of the rail member 10.

Use and Operation

Figure 4:
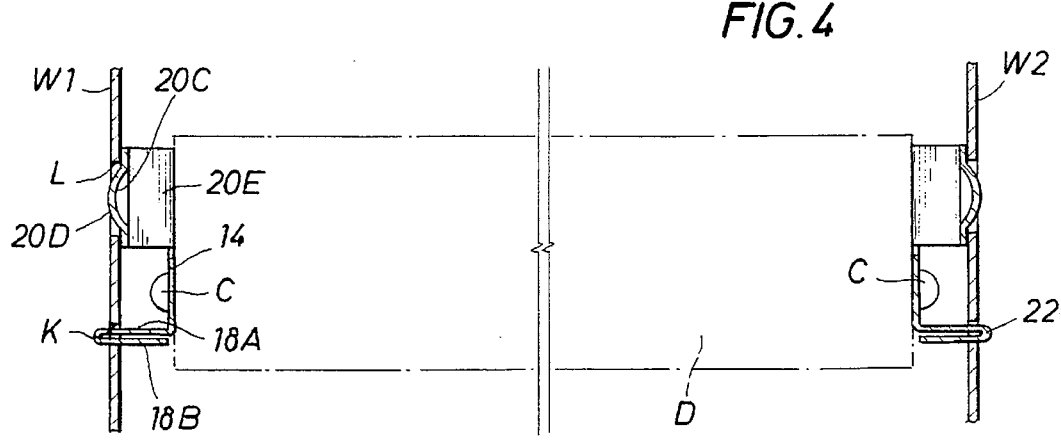
FIG. 4 is an enlarged broken section view taken along line 4—4 of FIG. 1.
Figure 5:
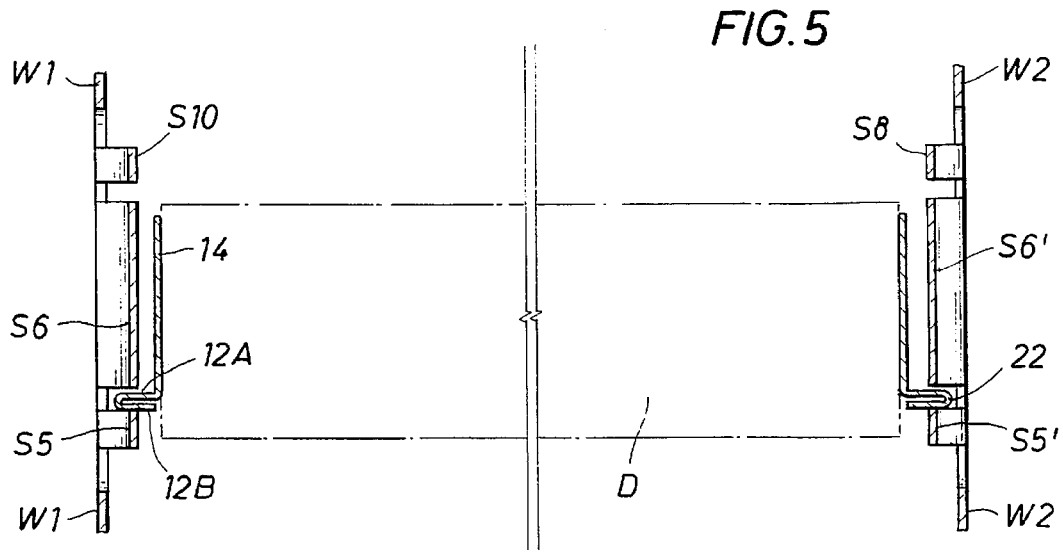
FIG. 5 is an enlarged broken section view taken along line 5—5 of FIG. 1.

The rail members 10, 22 of the present invention are attached by screws C to their respective sides of the drive unit D, such as shown in FIGS. 2 and 4. The rail member's elongated slots, such as 14A, allow for variance in the positioning of the holes of the drive member to the rail members. After the rail members are attached to the drive unit, which can be either a floppy disk drive, a hard drive, a tape drive or any other type of drive unit used with a computer unit, the drive unit is positioned in a selected bay in the frame F so that the horizontal member lower portion, such as 12B, of the rail members are positioned above their respective track members. The drive unit D is then further inserted into the frame until the tapered ends, such as 12A', of each rail member are received between their respective channel member, such as $S_2$ and $S_3$. This tapered configuration of the rail member facilitates the installation of the drive unit D. When the drive unit is pushed further into the frame channel member, the upper horizontal portion 12A engages the upper channel member to prevent upward movement of the rear end of the rail member, as shown in FIG. 1. The drive unit is then further moved into the frame until the tab member is received in the slit K which prevents upward movement of the front end of the drive unit. The insertion of drive unit into the frame F is complete when the abutment members engage the front wall $W_3$, $W_3'$ of the frame F, as best shown in FIG. 3.

During the above described installation of the drive unit into the frame F, the arm's angled ramps, such as 20E, located between the first end and the rear of the detents, are prevented from engagement with the frame by the stop shoulders of their respective abutment members. When the detents pass the front wall of the frame, the detents urge their arms inwardly until each detent is fully received in its slot, as best shown in FIGS. 1 and 4. In this position, the front edge of the detent moves outwardly so as to create an interference with the front edge of the D-shaped slot.

Though not needed, if desired, screws such as shown in FIG. 3 may be received into the holes of the abutment members to discourage removal of the drive unit. However, the arm detents in the D-shaped slots will positively maintain the drive unit in the frame.

To release the drive unit D from the frame F, the user can use the thumb and a finger of one hand to press the arms of the rail members together to disengage the drive unit and with the other hand pull the drive unit from the frame.

The foregoing disclosure and description of the invention are illustrative and explanatory thereof, and various changes in the size, shape and materials, as well as the details of the illustrative construction may be made without departing from the spirit of the invention.

What is claimed is:

1. Apparatus adapted for use with a computer system comprising, a frame having two sides, a front and a rear, one of said sides of said frame having a slot, a supporting member being disposed on each of said sides of said frame, and a rail member having an arm and being disposed on one of said supporting members, said rail member having an abutment shoulder to limit movement of said rail member into said frame, said arm movable relative to said slot between an extended position to maintain said rail member in said frame and a disengaged position for removing said rail member from said frame, said rail member abutment shoulder having a stop shoulder to limit the extended position of said arm.

2. Apparatus of claim 1 wherein each side of said frame having a slot.

3. Apparatus of claim 1 further comprising a drive member having two sides, said drive member having a rail member disposed on each side of said drive member.

4. Apparatus of claim 3 wherein each rail member includes a resilient arm.

5. Apparatus of claim 3 wherein said rail member having said abutment shoulder to limit movement of said drive unit into said frame.

6. Apparatus adapted for use with a computer system comprising, a frame having two sides, a front and a rear, one of said sides of said frame having a slot, a supporting member being disposed on each of said sides of said frame, a rail member having an arm and being in sliding engagement with one of said supporting members, said arm having a tab movable relative to said slot between an extended position in which said tab engages said slot to prevent sliding removal of said rail member in said frame and a disengaged position for removing said rail member from said frame, and said support member comprises a track member extending into said frame and supporting said rail, and a channel member also extending into said frame spaced apart from said track member and engaging said rail to limit upward movement of said rail.

7. Apparatus of claim 6 further comprising a drive member having two sides, said drive member having a rail member disposed on each side of said drive member.

8. Apparatus of claim 6 wherein said rail member having an abutment shoulder extending from said tab member to limit movement of said arm into said frame.

9. Apparatus of claim 8 wherein said arm extends beyond said abutment member.

10. Apparatus of claim 6 wherein said rail member having an abutment shoulder to limit movement of said arm into said frame whereby said abutment shoulder remains stationary when said arm moves to the disengaged position.

11. Apparatus of claim 6 wherein said rail member being tapered to guide said arm between said track member and said channel member.

12. Apparatus of claim 6 wherein said arm having a first end and a second end, a detent positioned intermediate said first end and said second end of said arm to be received in said slot.

13. Apparatus of claim 12 wherein said arm extends beyond the front of said frame when said arm detent is received in said slot to facilitate disengagement of said arm from said frame.

14. Apparatus of claim 6 further comprising a stop shoulder to limit movement of said arm.

15. Apparatus of claim 6 wherein said frame further includes:

a slit in at least one side of said frame, and said outwardly extending tab member adapted to be received in said slit.

16. Apparatus adapted for use with a computer system comprising, a one-piece rail member having a front end and a rear end, said rail member having an arm stamped from said rail member and an abutment member on said rail member front end, a stop shoulder on said rail member abutment member limiting extended movement of said arm, said arm having a first end and a second end, a detent positioned intermediate said first end and said second end of said arm, said arm movable between an extended position and a retracted position.

17. Apparatus of claim 16 wherein said second end of said arm extending beyond said abutment member of said rail member.

18. Apparatus of claim 16 wherein said rear end of said rail member is tapered.

* * * * *